United States Patent [19]

Vrana et al.

[11] Patent Number: 5,338,056
[45] Date of Patent: * Aug. 16, 1994

[54] REINFORCED HOLLOW UPPER CONTROL ARM FOR VEHICLE SUSPENSION SYSTEM

[75] Inventors: John J. Vrana, Rochester Hills; Leland M. Richart, Redford, both of Mich.

[73] Assignee: MascoTech, Inc., Novi, Mich.

[*] Notice: The portion of the term of this patent subsequent to May 10, 2011 has been disclaimed.

[21] Appl. No.: 32,459

[22] Filed: Mar. 16, 1993

Related U.S. Application Data

[63] Continuation of Ser. No. 805,294, Dec. 10, 1991, abandoned.

[51] Int. Cl.$^5$ .................................................... B60G 7/00
[52] U.S. Cl. ............................................. 280/673; 280/690; 280/691
[58] Field of Search .................. 280/663, 673, 675, 688, 280/690, 691; 267/228; 52/731; 29/897.2

[56] References Cited

U.S. PATENT DOCUMENTS

| | | | |
|---|---|---|---|
| 1,399,201 | 12/1921 | Fekete | 280/798 |
| 1,419,827 | 6/1922 | Dornier | 52/731 |
| 1,882,484 | 10/1932 | Carpenter | 280/691 |
| 2,202,665 | 5/1940 | Metz | 280/688 |
| 2,730,211 | 1/1956 | Findlay | 52/731 |
| 2,827,303 | 3/1958 | Herbenar | 280/673 |
| 3,237,362 | 3/1966 | Fromson | 52/731 |
| 3,951,225 | 4/1976 | Schwenk | 280/700 |
| 4,458,913 | 7/1984 | Rumpel | 280/663 |
| 5,147,097 | 9/1992 | Hiromoto et al. | 280/673 |
| 5,163,603 | 11/1992 | Richart | 228/141.1 |
| 5,169,055 | 12/1992 | Peterson et al. | 29/897.2 |

FOREIGN PATENT DOCUMENTS

| | | | |
|---|---|---|---|
| 219563 | 3/1958 | Australia | 280/663 |
| 1171278 | 5/1964 | Fed. Rep. of Germany | 280/691 |
| 2395161 | 2/1979 | France | 280/690 |
| 67507 | 4/1983 | Japan | 280/688 |
| 178408 | 8/1987 | Japan | 280/688 |
| 38117 | 2/1990 | Japan | 280/688 |
| 262407 | 10/1990 | Japan | 280/688 |

Primary Examiner—Karin L. Tyson
Attorney, Agent, or Firm—Edgar A. Zarins; Malcolm L. Sutherland

[57] ABSTRACT

An upper control arm for a vehicle suspension system having a modulus section of hollow construction for reduced weight. The modulus section of the control arm is of a stamped and welded construction thereby eliminating material weight while reducing the cost of manufacturing. The modulus section has a substantially triangular configuration with a reinforced rim flange along the high compression stress area of the control arm elbow. The reinforced rim flange improves the strength of the control arm without sacrificing the weight reduction provided by the hollow construction.

6 Claims, 1 Drawing Sheet

REINFORCED HOLLOW UPPER CONTROL ARM FOR VEHICLE SUSPENSION SYSTEM

This is a divisional continuation-in-part of copending application Ser. No. 07/805,294 filed on Dec. 10, 1991, now abandoned.

BACKGROUND OF THE INVENTION

I. Field of the Invention

This invention relates to an upper control arm for a vehicle suspension system and, in particular, to a control arm having a modulus section of hollow construction with an enlarged rim flange for reinforcement of high load stress areas of the control arm.

II. Description of the Prior Art

Upper control arms are routinely incorporated into the suspension systems of truck and passenger vehicles. The typical control arm is generally U-shaped with a ball joint assembly at the apex of the control arm and pivot bar bushings at the ends of the arm for mounting the control arm to a pivot bar assembly. In the past, the modulus sections between the bushings and the ball joint have been solid sections of cast iron or cast aluminum. It was believed that the traditional cast metal sections were necessary to maintain the integrity of the control arm under the stresses of the suspension system. More recently, the modulus section has been constructed of a steel forging of wire frame design. Although these control arm constructions were strong enough to withstand the stress loads they also were very heavy. In today's vehicle market every aspect of a vehicle is examined for weight reduction.

Recent proposals for reducing the weight of the suspension system include a hollow, two-piece control arm. The square hollow bar section comprises a pair of U-shaped components nested together and double seam welded. Thus, the control arm has double side walls with single upper and lower walls. Although strong and lightweight, the double side walls are not located at the compressive stress areas of the arm where additional strength is required. Moreover, the double seam construction requires precise welding over a curving contour which has not been easy to accommodate. Nevertheless, substantial weight reduction over the solid cross-section of the prior known control arms has been accomplished.

SUMMARY OF THE PRESENT INVENTION

The present invention overcomes the disadvantages of the prior known control arms for vehicle suspension systems by incorporating a modulus section of hollow construction having a substantially triangular configuration in order to distribute the compressive stress loads associated with the suspension system. An enlarged rim flange at the joint apex of the stamped triangular construction provides improved reinforcement at the high compression stress areas of modulus section.

Typical of control arms, the present invention has a substantially U-shaped configuration with a ball joint assembly at the apex and pivot bar bushings at the ends of the control arm. However, the control arm of the present invention includes a modulus section having a substantially triangular hollow cross-section which reduces the overall weight of the control arm while maintaining strength in key stress areas of the elbow sections. The hollow triangular sections are formed through a stamping process wherein the upper apex of the modulus section incorporates a seam weld to form the triangular cross-section. For increased stiffening and reinforcement, an enlarged rim flange is formed along the welded apex seam. This rim flange along the high compression stress areas of the control arm elbow eliminates stress failures along this area and permits double plate FEA modeling resulting in additional load balancing capabilities.

Other objects, features and advantages of the invention will be apparent from the following detailed description taken in connection with the accompanying drawings.

BRIEF DESCRIPTION OF THE DRAWINGS

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
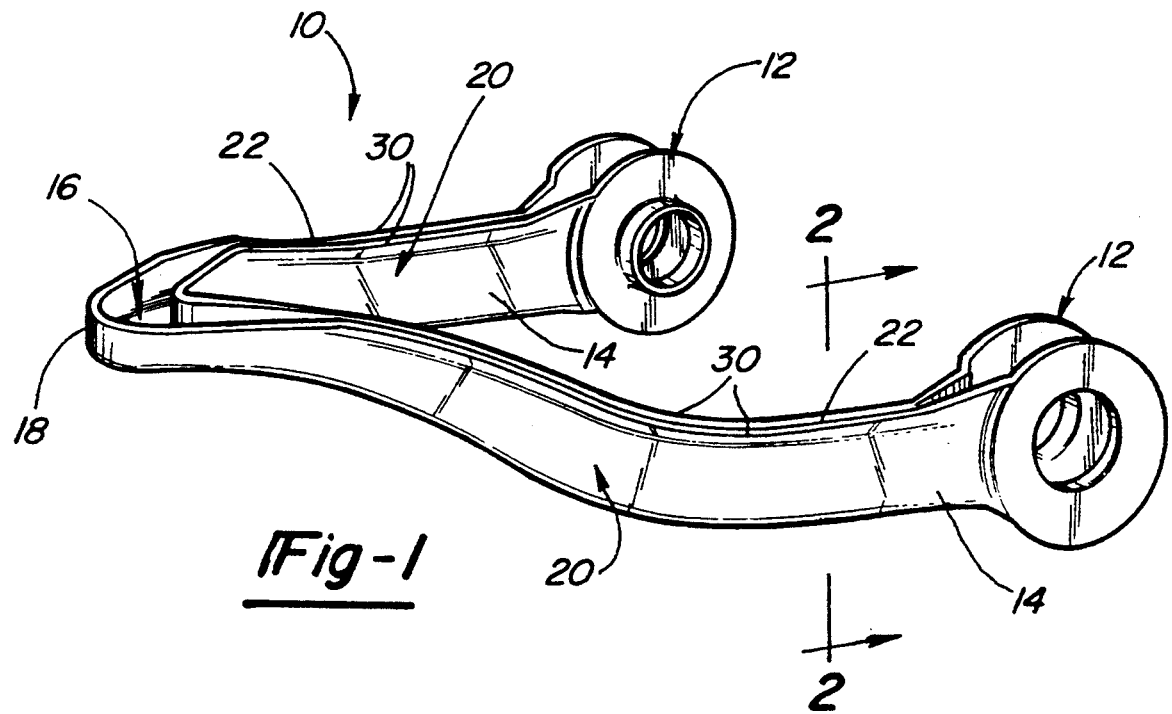
FIG. 1 is an elevated perspective view of a upper control arm for a vehicle suspension system embodying the present invention.
Figure 2:
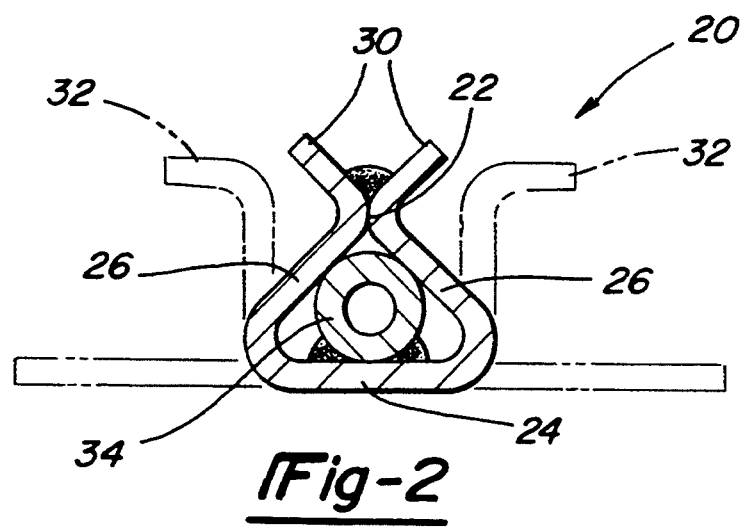
FIG. 2 is a cross-sectional view of the control arm taken along lines 2—2 of FIG. 1.

Referring to FIGS. 1 and 2, there is shown elevational and cross-sectional views of a control arm 10 embodying the principles of the present invention. The control arm 10 is preferably an upper control arm forming a part of a suspension system of a vehicle. As is typical of such components, the control arm 10 has a substantially U-shaped configuration with bushing apertures 12 formed at the ends of the arms 14 and a ball joint receptacle 16 formed at the apex 18 of the control arm 10. The ball joint receptacle 16 is adapted to cooperate with a ball joint assembly (not shown) and may include a ball joint housing integrally formed with the control arm 10. Typical modern control arms 10 incorporate a separate ball joint housing which is inserted into the apex 18 of the control arm 10. The bushing apertures 12 are designed to retain pipe bushings (not shown) for mating engagement with a pivot bar assembly forming a portion of the vehicle suspension system. The pivot bar typically extends through both bushing apertures 12 allowing the control arm 10 to pivot about the assembly in response to road conditions affecting the vehicle suspension system.

The control arm 10 of the present invention is formed of an integral metal stamping to ensure the required structural strength for the suspension system. However, unlike the prior known control arms which incorporate a solid construction, the present invention comprises hollow modulus sections 20 for weight reduction. The control arm 10 includes modulus sections 20 along each arm 14 between the apex 18 and the bushing apertures 12. These modulus sections 20 are subject to extreme compression and tension loads and therefore must have sufficient structural strength to withstand such loads. In order to maintain the structural strength while providing substantial weight reduction, the modulus sections 20 of the control arm 10 of the present invention are provided with a hollow, substantially triangular cross-sectional configuration as best shown in FIG. 2. It has been found that this triangular configuration provides improved strength against the loads while also providing a uniform weld line over the contours of the modulus sections 20 facilitating programmable welding of the seam 22 along the modulus sections 20.

The triangular modulus section 20 of the control arm 10 include a bottom wall 24 and a pair of side walls 26 brought into mutual contact to form the seam 22 at the upper apex of the triangular configuration. The upper seam 22 is welded to join the side walls 26. In a preferred embodiment, a reinforcement rim flange 30 may be provided along the upper seam 22. The rim flange 30 is formed by integral extension flanges 32 of the side walls 26. The rim flange 30 provides a stiffening effect to the modulus sections 20 of the control arm 10 thereby improving structural strength.

For additional strength, one or more reinforcement members 34 may be inserted within the hollow modulus sections 20. These reinforcement members 34 may be in the form of a hollow tube or a solid bar and are positioned at the high stress coordinates of the control arm 10. Thus, although the reinforcement members 34 may be inserted along the full length of the modulus sections 20 it is preferable to insert the members 34 only at the areas of greatest load thereby minimizing added weight. The reinforcement members 34 are preferably welded to the bottom wall 24 prior to bending the side walls 26 into mutual to form the triangular modulus sections 20. Thus, the present invention provides a reinforced hollow modulus section 20 of a control arm 10 while minimizing added weight.

The foregoing detailed description has been given for clearness of understanding only and no unnecessary limitations should be understood therefrom as some modifications will be obvious to those skilled in the art without departing from the scope and spirit of the appended claims.

What is claimed is:

1. A control arm for a vehicle suspension system adapted to be connected to a ball joint assembly and a pivot bar assembly, said control arm comprising:

an integral body having a substantially U-shaped configuration, said integral body including a bottom wall and side walls extending upwardly from said bottom wall and means for receiving the ball joint assembly at an apex of said body mounted to said bottom wall at the apex of said U-shaped body, said body having means for receiving the pivot bar assembly at the remote ends of said body;

said integral body having modulus sections along a substantial part of the length of each arm extending from said apex of said body, said apex having a U-shaped cross-sectional configuration and said modulus sections having a hollow, substantially triangular cross-sectional configuration with an upper seam along an apex of said triangular modulus sections formed by joining opposing edges of said side walls extending from said bottom wall; and a reinforcement member positioned within at least a portion of said hollow modulus sections, said reinforcement member being mounted within said modulus sections at high load stress coordinates of said control arm for increased structural strength.

2. The control arm as defined in claim 1 wherein said triangular modulus section includes a bottom wall and a pair of integral side walls joined to form said upper seam.

3. The control arm as defined in claim 2 wherein said reinforcement is welded to an interior surface of said bottom wall of said hollow, triangular modulus section.

4. The control arm as defined in claim 3 wherein said side walls include integral flanges, said flanges extending outwardly from said upper seam forming a reinforcement rim flange along said seam.

5. A control arm for a vehicle suspension system adapted to be connected to a ball joint assembly and a pivot bar assembly, said control arm comprising:

an integral body having a substantially U-shaped configuration, said body having a bottom wall and a pair of integral side walls extending upwardly from said bottom wall, first means for receiving the ball joint assembly mounted in the bottom wall at an apex of said body, and parallel plate members for receiving the pivot bar assembly at remote ends of said body;

said integral body having modulus sections along a substantial pat of the length of each arm extending from said apex of said body, said apex having a U-shaped cross-sectional configuration and said modulus sections having a hollow, substantially triangular cross-sectional configuration formed by said integral bottom and side walls, said side walls jointed at their edges to form an upper seam along an apex of said triangular modulus sections; and a reinforcement member positioned within at least a portion of said hollow modulus section, said reinforcement member being mounted within said modulus sections at high load stress coordinates of said control arm for increased structural strength.

6. The control arm as defined in claim 5 wherein said side walls include integral flanges, said flanges extending outwardly from said upper seam forming a reinforcement rim flange along said seam.

* * * * *